H. M. PLAISTED.

ROTARY HAMMER.

APPLICATION FILED DEC. 13, 1919.

Reissued July 27, 1920.

14,926.

INVENTOR.
H. M. Plaisted.

BY T. H. Carmichael
ATTORNEY.

UNITED STATES PATENT OFFICE.

HAROLD M. PLAISTED, OF ST. LOUIS, MISSOURI, ASSIGNOR OF FORTY-NINE ONE-HUNDREDTHS TO WILLIAMS PATENT CRUSHER & PULVERIZER CO., OF ST. LOUIS, MISSOURI, A CORPORATION OF MISSOURI.

ROTARY HAMMER.

14,926. Specification of Reissued Letters Patent. Reissued July 27, 1920.

Original No. 1,301,316, dated April 22, 1919, Serial No. 240,393, filed June 17, 1918. Application for reissue filed December 13, 1919. Serial No. 344,710.

*To all whom it may concern:*

Be it known that I, HAROLD M. PLAISTED, a citizen of the United States, residing at the city of St. Louis, State of Missouri, have invented certain new and useful Improvements in Rotary Hammers, of which the following is a specification.

This invention relates to certain new and useful improvements in a rotary hammer, the peculiarities of which will be hereinafter described and claimed.

The main object of my invention is the provision of a rotary hammer having one or more wide operative edges and a shank of small relative thickness compared to its width set transversely to said edges, like a T, so as to present comparatively little surface to the material being reduced, and to provide means for avoiding interference between said hammers.

In the accompanying drawing on which like reference letters indicate corresponding parts,—

Figure 1:
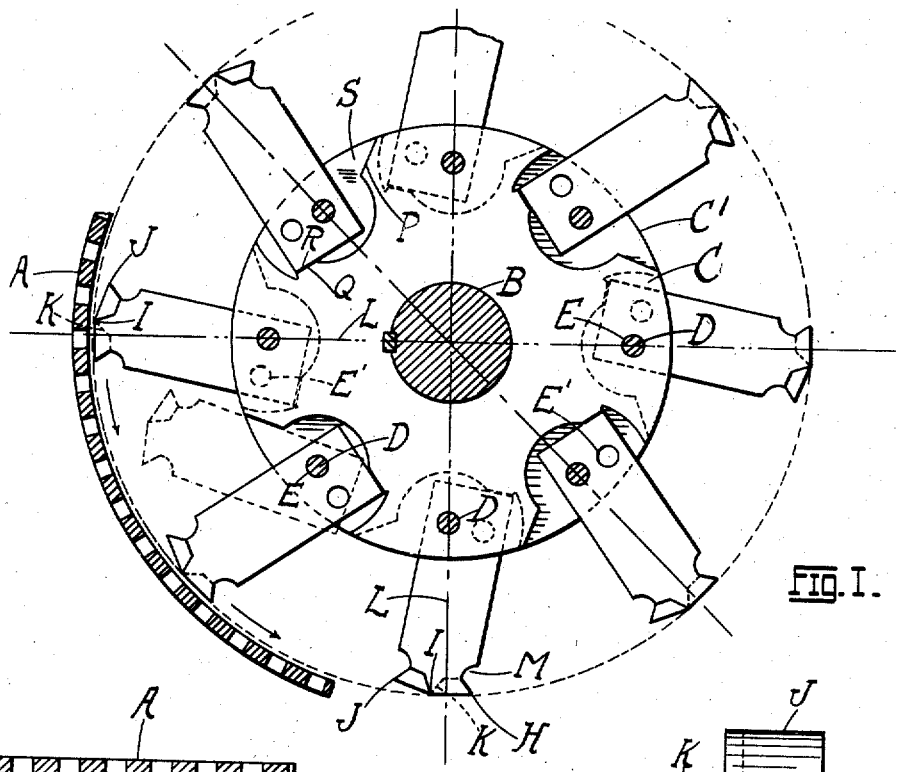
Figure 2:
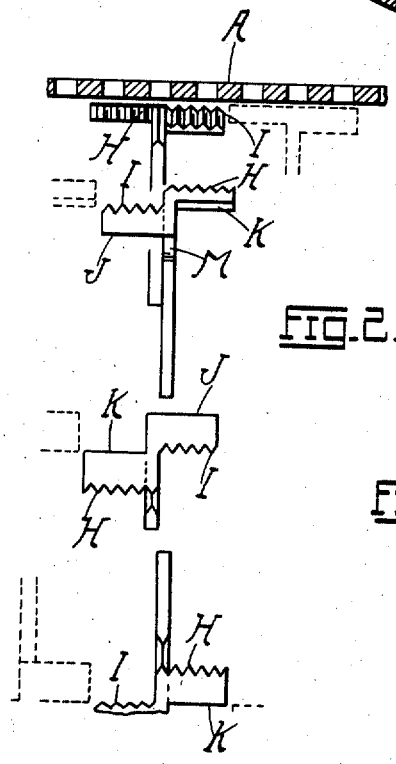
Figure 3:
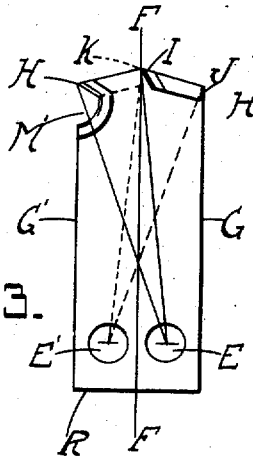
Figure 4:
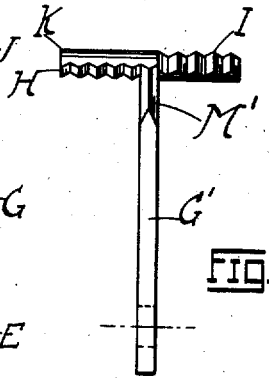

Figure 1 represents a partial transverse sectional elevation of a reducing machine embodying my invention;

Fig. 2 a partial section of the cage taken in an opposite direction, showing the preferred relation of my rotary hammers by an edge view of their periphery;

Fig. 3 a detail face view of a shank of my hammer with its T-head;

Fig. 4 a similar side edge view of the shank and T-head; and

Figure 5:
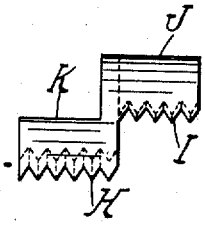

Fig. 5 a top view of the head shown in Figs. 3 and 4.

The letter A designates an arcuate cage of any suitable form concentric with a shaft B on which are fastened hammer mounts, preferably consisting of disks C—C' supporting hammer rods D on which are pivoted rotary hammers, the pivot ends of which are mounted in suitable pockets S formed in said disks.

These hammers consist of flat bar shanks, or other shape in which the thickness is comparatively small with regard to the width. The hammer is so mounted that only this lesser dimension or edge thickness is presented to the material operated on during the forward rotation of the hammer. One end of said shank is provided with a pivot hole E, or other means for pivotally mounting said hammer. There are preferably two of said holes, the other hole E', being located the same distance on the opposite side of a longitudinal central line F through said shank, as is the center of said hole E.

At the other end of said shank there is provided a cross piece extending laterally outward from each face of said shank in opposite directions and substantially the same distance, so as to form a T-head. The lateral projections forming said T-head extend outward substantially at right angles to the flat faces of the shank; and are likewise of lesser thickness, measured radially through the pivot, than the width measured in the plane of rotation. The narrow side dimension or radial edge thickness of these lateral projections forming the head is presented to the material being reduced, similarly to the presentation of the side edge of the flat bar shank. By forming a T-head and shank on my principle, none of the flat side or width of the bar is presented to the material being reduced, but only the side edge thickness or lesser dimension of said bar. My hammer therefore tends to slice through the material being reduced; and likewise tends to avoid carrying around with the hammer the material being operated on, as is the tendency with a hammer in which any of the flat side, or width of a flat bar is presented toward the material being reduced. This cross piece is preferably zigzag in plan view as shown in Fig. 5, and is preferably formed, when of this zigzag shape, by splitting the outer end of said shank for a portion of the length along the longitudinal center line, and then forcing the respective halves of said end over in opposite directions until they are substantially at right angles to each face of said shank, and with each edge on the respective halves substantially equi-distant from the respective pivot hole center, measured diagonally across said central line F. In a quarter twist hammer the head and shank at the junction are not directly presenting the lesser dimension of the bar to the material being reduced, but inevitably present part of the width of the shank to the material at the junction of head and shank, and thereby carry around with the hammer some of the material and obstruct the slicing action that is desired. It is to over-come this objection in a previous form of hammer in which the head and shank are connected by a quarter twist, that the present T-head is formed directly extending laterally outward on each side of the flat bar shank, substantially as shown. In this zigzag form of T-head in which the cross plate forms the T-head, the operative edges on each side of the shank are not directly alined but are zigzag in the preferred form. The cross piece plate head may be otherwise formed however. Four operative edges are thus formed on said cross piece,—two edges on said sides of the shank G—G′ being separated substantially the width of the shank, and the other two operative edges being substantially in line with each other and traversing the central line F. In Fig. 3 full lines have been drawn from center of the hole E to the operative edges H and I at the side G, and the center line F, respectively. These lines indicate that these operative edges are substantially equi-distant from the center of the hole E. The dashed lines in the same figure indicate that the operative edges J and K respectively adjacent to the side G and the central line F are likewise equi-distant from the center of the hole E′. This arrangement of the operative edges causes the cross piece forming the T-head to assume the shape of two bevels as shown in Fig. 3. The action of a forging machine in forming hammers of this kind, will readily swage the split end of the hammer into the shape desired so that the operative edges will be substantially as shown in the drawing.

As will be seen by reference to Fig. 1, the forward operative edge H is in front of a radial line L from the shaft through the pivot center E, and the edge I—K is a little behind said radial line,—when said hammer is in its normal position under rotation. Thus said forward edges H and I of the T-head are substantially the same distance from the cage A, while the rear edge J is a farther distance from said cage, due to the bevel of said T-head and to the eccentric location of the pivot center E. When said hammer is reversed and mounted on the pivot hole E′ the edges J and K come into similar operation.

The operative edges above described may be of any kind and shape desired; that is, they may be sharp as shown in Fig. 1 throughout their length, or may be serrated with an under-cut saw-tooth shape as shown in Figs. 3, 4 and 5; or may be otherwise formed. When the front edges H and I are of saw-tooth shape they are especially adapted to cutting alfalfa and like material, and by their increased length of cutting edge facilitate the cutting action and make the power required for rotating the hammers much less than other form of cutting edge. Alfalfa mills however have a tendency to throw out the material entering the mill, and I have therefore shown the edges J and K as plain or square edge in Fig. 3, and the edges H and I in the opposite direction being formed with saw teeth. When a hammer of this design is mounted in disks as shown in Fig. 2,—that is, with the forward edges of one hammer plain and the following hammer with the forward edges serrated,—the action of the hammers is to to draw in as well as to cut the alfalfa or like material.

While the forward edge of a hammer of my construction only presents the lesser dimension or edge thickness of the bar to the material being cut and allows the cutting edges to operate upon the material and pass through said material with little obstructions, it is desirable to extend the cutting edge opposite the sides G and G′ so as not to lose the benefit of the thickness of the bar. This I do by means of a cut-out or notch M by which the bevel of the operative edge, H for instance, is carried past and through the thickness of the bar. In the use of a saw-tooth edge, this notch M would be sharpened, as shown at M′, Figs. 3 and 4, to avoid the alfalfa collecting on the side of the shank.

In a previous construction shown in Patent No. 1,281,829, dated October 15, 1918, I have likewise shown two pivot holes in the end of a rotary hammer and have claimed them broadly in connection with the operative edges there shown.

In Fig. 1 is shown a bearing edge P, and a bearing edge Q, located respectively beyond, and inside, of the pivot of the hammer in its pocket S formed by a cut-out opening in the adjacent disk. These edges in said pocket are adapted to contact with the side G of said shank, and with a contact surface R at the inner end of said shank, respectively, and thus form stops for the oscillation of said hammer in both directions. It is especially necessary to limit the oscillation of hammers having sharp edges and prevent two hammers hitting each other when one or both rebound, and thus dulling said edges. I avoid such interference by providing the bearing surfaces P and Q located on the wall of the pocket as shown in this application. It will be noted that the bearing surface Q and the contact surface R, that meet when the hammer is on a rebound from the dotted position shown in Fig. 1, are both located radially inside of the pivot on which the hammer is then operating, but are on the opposite side of a radius from the center of the shaft through said pivot, from the stop or bearing surface P of said pocket. In my application above referred to, I have shown such stop surfaces as both located on the same side of the pivot, but in a hammer of the construction shown in which the end that is pivoted is substantially square, I have claimed the location and stop surfaces as shown in this application.

It will be observed from the above that the hammer as an entirety while substantially T-shaped has one cutting or reducing edge in advance of the other, but the speed at which these mills are usually operated, establishes almost a condition of static equilibrium, so that there is no torsional strain on the shank of the hammer.

I claim:

1. A rotary hammer comprising a flat bar shank having two holes at one end for pivotal mounting, said holes being located on opposite sides of a central longitudinal line, and a T-head on said shank having four operative edges extending transversely in opposite directions from the faces of said shank, each pair of said edges being substantially equidistant from the center of the respective pivot holes, measured diagonally across the central longitudinal line.

2. A rotary hammer comprising a flat bar shank having a pivot hole at one end and a zigzag cross piece forming a T-head at the other end, said head having four operative edges, two of said edges being separated by substantially the width of said shank, and the other two edges being substantially alined with each other and extending in opposite directions from the respective face of said shank.

3. A rotary hammer comprising a flat bar shank having a pivot hole near one end, and provided with a T-head having a sawtooth cutting edge adjacent to one side of said shank, and a plain edge adjacent to the other side of said shank, substantially as and for the purpose described.

4. A rotary hammer comprising a flat bar shank, having a pivot hole near one end, and provided at the other end with a T-head having an operative cutting edge adjacent to one side of said shank, said shank being sharpened for a portion of the side adjacent to said head, substantially as described.

5. The combination with a rotary pivot hammer having part of a side radially beyond its pivot adapted for contact, and another part of the hammer radially inside of the pivot but on the opposite side of a central line through said shank also adapted for contact, of a disk having a pocket for the pivot end of said hammer, said pocket having bearing edges forming stops limiting the oscillation of said hammer and preventing interference with adjacent hammers and located radially beyond said pivot, and radially inside of said pivot respectively but on opposite sides of a radial line from the shaft through said pivot, respectively, substantially as described.

6. A rotary hammer comprising a shank and a T-head, said T-head being formed integral with the shank and having four operative edges.

7. A rotary hammer comprising a shank and a T-head, said T-head being formed integral with the shank and each leg of said T-head having oppositely disposed cutting edges.

8. A rotary hammer comprising a shank and a T-head, said T-head being provided with oppositely disposed cutting edges, one of said edges being plain and the other edge being serrated.

9. A hammer provided with a shank and a T-head having staggered serrated cutting edges and plain cutting edges opposite thereto, said shank being provided with openings on each side of the longitudinal axis of the hammer.

In testimony whereof, I hereunto affix my signature, this 1st day of December 1919.

HAROLD M. PLAISTED.